May 14, 1957 B. L. McARDLE 2,792,525
TIME SELECTION CIRCUIT
Filed Feb. 23, 1952 3 Sheets-Sheet 1
FIG. 2
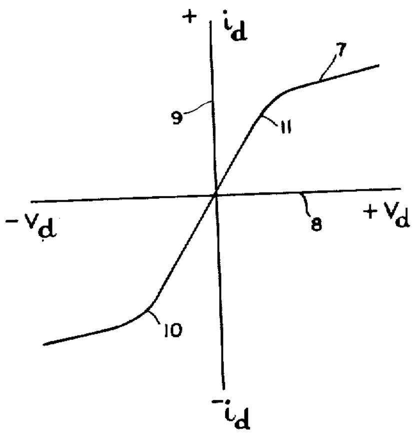
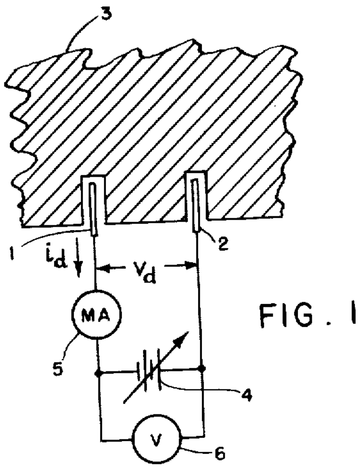
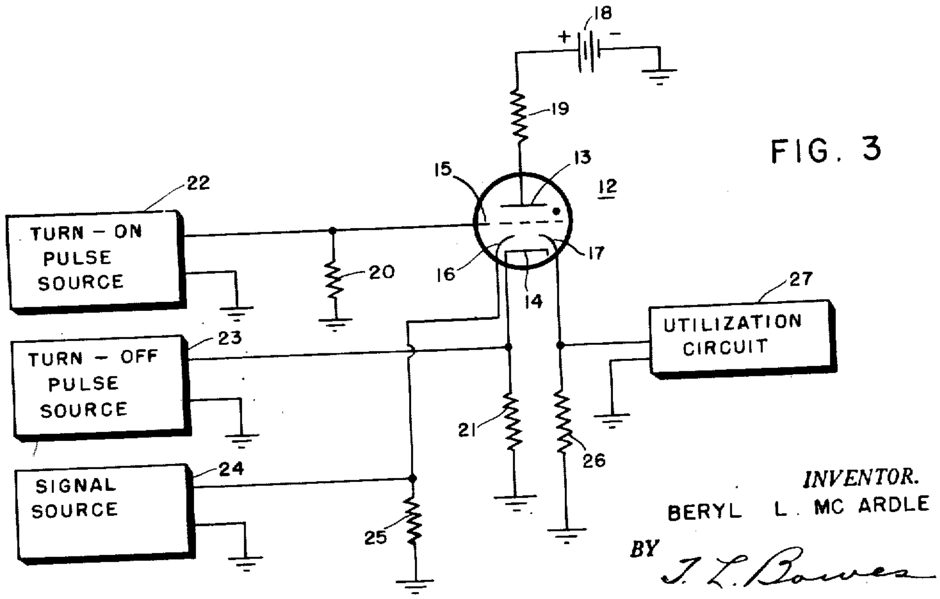
INVENTOR.
BERYL L. MC ARDLE
BY T. L. Bowes
ATTORNEY May 14, 1957 B. L. McARDLE 2,792,525

TIME SELECTION CIRCUIT

Filed Feb. 23, 1952 3 Sheets-Sheet 2

INVENTOR.
BERYL L. MC ARDLE

BY T. L. Bowes

ATTORNEY

May 14, 1957 B. L. McARDLE 2,792,525

TIME SELECTION CIRCUIT

Filed Feb. 23, 1952 3 Sheets-Sheet 3

*INVENTOR.*
BERYL L. MC ARDLE
*BY* T. L. Bowes
ATTORNEY

United States Patent Office 2,792,525

Patented May 14, 1957

2,792,525

TIME SELECTION CIRCUIT

Beryl L. McArdle, Rochester, N. Y., assignor, by mesne assignments, to General Dynamics Corporation, a corporation of Delaware Application February 23, 1952, Serial No. 273,017

7 Claims. (Cl. 315—84.5)

My invention relates to gate circuits, and particularly to gate circuits useful in electrical pulsing systems.

A gate circuit operates in conjunction with a source of signal potential and a source of control pulses. When a pulse from the control pulse source is applied to the gate circuit, whatever potential is being furnished by the source of signal potential at that time is allowed to pass through the gate circuit. When the pulse from the control pulse source ceases, output from the gate circuit ceases also.

It is to be noted that a gate circuit may be made to perform a repeating function, that is, the input signal may be repeatedly passed through the gate circuit as the latter is repeatedly turned on and off by pulses from the control pulse source. On the other hand, the gate circuit may consist of multiple gating stages which operate in sequential order. In this arrangement, the first gating circuit of the group takes a first sample of the input waveform, the second gating circuit of the group takes a second sample at a later time, and so on until the last stage of the group performs its sampling function. The sampling function then reverts to the first tube of the group and the sequence repeats.

Multiple-stage gate circuits may be used to sample a single waveform, in which case the outputs of the individual stages of the gate circuit each comprise a series of discrete samples of that single input waveform, with no one of the outputs containing the same samples as the outputs of the other stages. An alternative arrangement is to feed various input signals into corresponding ones of the gating stages. Under these circumstances the outputs contain discrete samples of the various inputs.

The outputs of the various gating stages may be combined, in which case the output waveform comprises discrete samples of the various input signals taken at the times when the individual gating stages of the gate circuit were turned on. The single-signal input, combined-output arrangement is useful in obtaining a sampling of a speech waveform for use with pulse-multiplex communication systems, while the multiple-signal input, combined-output arrangement performs the function of a commutator and serves to combine samples of information from various sources for use with a single communication channel. The latter scheme finds particular application in the telemetering systems.

As far as I am aware, it has been necessary before my invention to employ, in a multiple-gating arrangement, a means which is separate from the gate circuit itself for commutating the control pulses from one gating stage to the next. Such separate commutating means are expensive and occupy space that is valuable for other purposes.

The gating functions themselves were usually performed, prior to my invention, by "hard," or vacuum, tubes because such tubes offered the greatest ease of control.

It is accordingly an object of my invention to provide a gate circuit of a new, useful, and inexpensive type.

It is a further object of my invention to provide a gate circuit in which operation is more positive and easier to control than with vacuum tubes because the gate-on function can occur only in the presence of a gaseous discharge.

It is still another object of my invention to provide a gate circuit employing multiple gating stages in which sampling by sequential stages of a variety of input potentials is performed by the same circuit which performs the function of switching the control pulses from stage to stage.

It is a further object of my invention to provide a gate circuit which also performs the function of clamping to a particular pulse amplitude yet does not require electron discharge devices in addition to those used in the gate circuit itself.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which—

Fig. 1 is a schematic diagram of an arrangement forming the basis of one element of my invention;

Fig. 2 is a graph illustrating the electrical relationships existing in the arrangement of Fig. 1;

Fig. 3 is a schematic diagram, partially in block form, of one embodiment of my invention;

Figure 5:
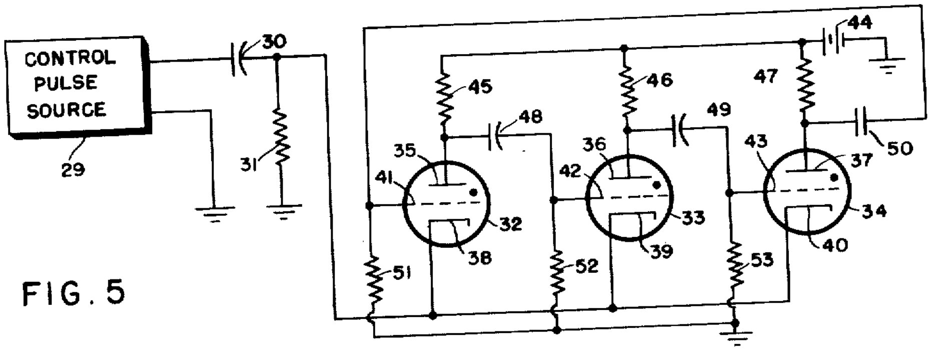
Fig. 5 is a schematic diagram of a circuit which forms an element of another embodiment of my invention.

Referring now to Fig. 1, there is shown a pair of electrodes, 1 and 2, respectively, extending into the plasma 3 of a gaseous discharge. A battery 4 applies potential $V_d$ between electrodes 1 and 2. The current $i_d$ which flows when the gaseous discharge is taking place is measured by milliammeter 5. The voltage of battery 4 is indicated by voltmeter 6. The arrangement shown in Fig. 1 is shown in Fig. 5 of an article by E. O. Johnson and L. Malter, "A floating double probe method for measurements in gas discharges," Physical Review, October 1, 1950; page 60.

The electrical relationship between the current $i_d$ and voltage $V_d$ existing in the arrangement of Fig. 1 is shown graphically by curve 7 in Fig. 2. Fig. 2 is Fig. 7 of the above-cited article. $V_d$ is plotted horizontally on the abscissa 8, while $i_d$ is plotted vertically on the ordinate axis 9. It will be observed that there is a linear region (10—11) of considerable extent about the origin of the graph. This linear region indicates that the circuit shown in Fig. 1 exhibits resistance-like characteristics. In the form shown in Figs. 1 and 2, the circuit is useful only in determining the characteristics of a gaseous discharge.

According to my invention, I combine a modification of the arrangement of Fig. 1 with other elements to form a new and useful gate circuit. For example, I may employ the pair of probe elements and a conventional gaseous discharge vacuum tube according to the circuit diagram of Fig. 3. Here is shown a gaseous discharge tube 12 having an anode 13, a cathode 14 and a control element, or grid, 15. Also enclosed in the envelope of tube 12 are probe elements 16 and 17, indicated schematically between cathode 14 and control element 15. Anode 13 is supplied from a suitable source of positive potential, such as battery 18, through resistor 19. Grid 15 has a grid return resistor 20, while cathode 14 has a cathode return resistor 21. The ground symbol used in this specification represents a plane of reference potential, and not necessarily a return to earth.

The gaseous discharge within tube 12 is initiated by a pulse received from a source 22 of positive pulses which, for want of a better name, I term "turn-on" pulses. I prefer that the turn-on pulses each be short and therefore cease soon after initiating the gaseous discharge within tube 12.

The gaseous discharge within tube 12 is terminated by a pulse from turn-off pulse source 23 which is applied across cathode bias resistor 21. Turn-off occurs because the voltage of a turn-off pulse at cathode 14 is higher than the voltage at anode 13, when tube 12 is conducting.

It will be observed that, in the arrangement of Fig. 3, a signal source 24 continuously supplies signal potential to resistor 25 connected from probe element 16 to ground. A resistor 26 is connected in similar fashion between probe element 17 and ground. Since resistors 25 and 26 are connected in series across probe elements 16 and 17, the relationship between voltage and current is similar to that shown in Fig. 2. Signal source 24 may supply any information waveform it is desired to sample; for example, the signal supplied may be a speech waveform.

I have indicated in Fig. 3 that a utilization circuit 27 is connected to resistor 26, but I have represented the utilization circuit as a block because the particular configuration within that block may take many forms, none of which affects the principles of operation of my invention. I prefer, however, that the utilization circuit be non-dissipative in character, or at least that it not load resistor 26 too heavily. An example of a non-dissipative utilization circuit is a cathode-follower, although many other satisfactory utilization circuits are known to those skilled in the art to which my invention appertains. I employ the term "utilization circuit" as generic to any circuit capable of utilizing the potential developed across resistor 26.

Since current can flow in resistor 26 only when a gaseous discharge occurs in tube 12, and since the starting and stopping of a discharge is controlled by pulse sources 22 and 23, respectively, it can be seen that the embodiment of my invention shown in Fig. 3 performs the function of a gate circuit. That is, utilization circuit 27 receives a potential proportional to the signal from signal source 24 only between the times of occurrence of pulses from sources 22 and 23.

Instead of a turn-on pulse source and a turn-off pulse source, I may prefer to use a single pulse source which performs both functions. In that case, negative pulses may be applied across resistor 21, their amplitude being large enough to turn on the gaseous discharge within tube 12 at the desired time; cessation of the negative pulse then turns off the discharge.

Figure 4:
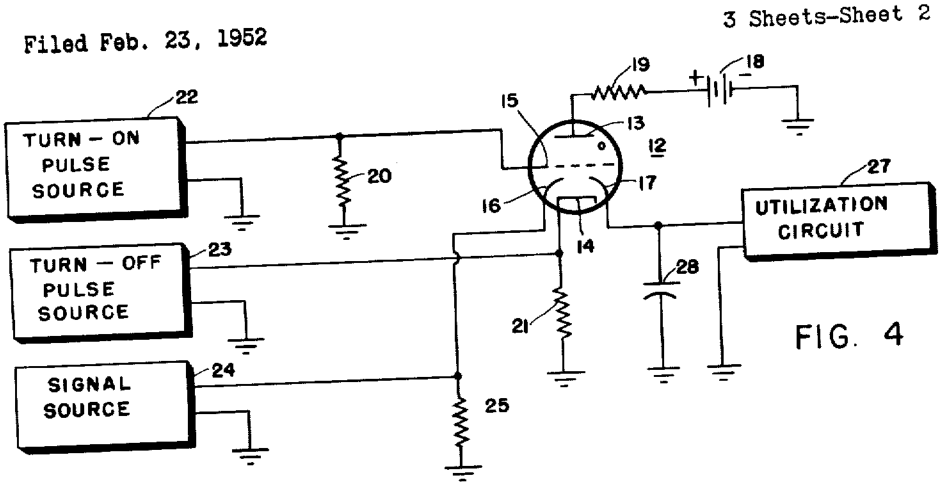
Fig. 4 is another embodiment of my invention in schematic form.

The circuit of Fig. 4 is identical with that of Fig. 3 except for the substitution of capacitor 28 in Fig. 4 for resistor 26 in Fig. 3. In Fig. 4, current flowing through the effective series connection of resistor 25 and capacitor 28 across probe elements 16 and 17 charges capacitor 28 to its peak value. This peak value is the peak value of the voltage developed across resistor 25 minus the drop across probe elements 16 and 17. This embodiment of my invention requires that utilization circuit 27 be substantially dissipation-free. Consequently, after the discharge within tube 12 ceases, capacitor 28 maintains its charge until the next conduction period of tube 12 causes capacitor 28 to assume a different amount of charge. The modification of Fig. 3 shown in Fig. 4 therefore provides a clamping function; in other words, the potential furnished by signal source 24 is sampled at the conduction times of tube 12, and capacitor 28 maintains the charge during non-conduction times. In this way, a step-function of the signal from source 24 is passed to utilization circuit 27. Capacitor 28 is said to "clamp" the potential samples applied to it.

Where a gate circuit employing multiple gating stages is required, I employ a ring-of-*n* counting circuit as part of my invention. I prefer to use the particular ring-of-*n* counting circuit shown in Fig. 5. (In the cases illustrated, $n=3$.) The circuit of Fig. 5 is operative, as are ring-of-*n* counting circuits generally, to transfer conduction from tube to tube around the ring in response to the occurrance of control pulses received from a control pulse source 29. The circuit of Fig. 5 is included here as an aid to the understanding of Figs. 6 and 7. (Ring circuits are discussed in B. Chance (ed.) "Waveforms," McGraw-Hill Book Company, Inc., New York, N. Y., 1949; page 602 et seq.) Pulses from control pulse source 29 are passed through coupling capacitor 30 and applied across cathode resistor 31. Resistor 31 is common to gaseous discharge tubes 32, 33 and 34. Each of these tubes is provided with an anode (35, 36, and 37, respectively), a cathode (38, 39 and 40, respectively), and at least one control element, or grid (41, 42, and 43, respectively). Each anode is supplied from a suitable source of positive potential, such as battery 44, through resistors 45, 46 and 47, respectively. The output of anode 35 is fed to grid 42 through coupling capacitor 48; the output of anode 36 is connected to grid 43 through coupling capacitor 49, and the output of anode 37 is connected to grid 41 through coupling capacitor 50. Grids 41–43, inclusive, are provided with grid return resistors 51, 52 and 53, respectively.

The operation of this circuit is as follows: Assume that tube 32 is conducting. The voltage on anode 35 is therefore low, and coupling capacitor 48 is charged to this potential. A positive pulse from control source 29 applied across cathode resistor 31 raises the potential of cathode 38 to the point where conduction ceases within tube 32. The voltage of anode 35 then rises to the voltage of battery 44. Capacitor 48 charges to the value of anode 35, this charging current flowing through resistor 52. The pulse appearing across resistor 52 as a result of this current flow is now applied to grid 42 and causes a gaseous discharge to occur within tube 33. When the next pulse is received from control pulse source 29, the action described for tube 32 takes place for tube 33; and the following pulse causes the same action to occur in tube 34. In other words, the conducting tube is extinguished during the time a pulse is being received from control pulse source 29, and the succeeding tube in the loop fires when the control pulse ceases. Conduction is thus passed from tube to tube around the loop or ring as dictated by the control pulses from source 29.

Figure 6:
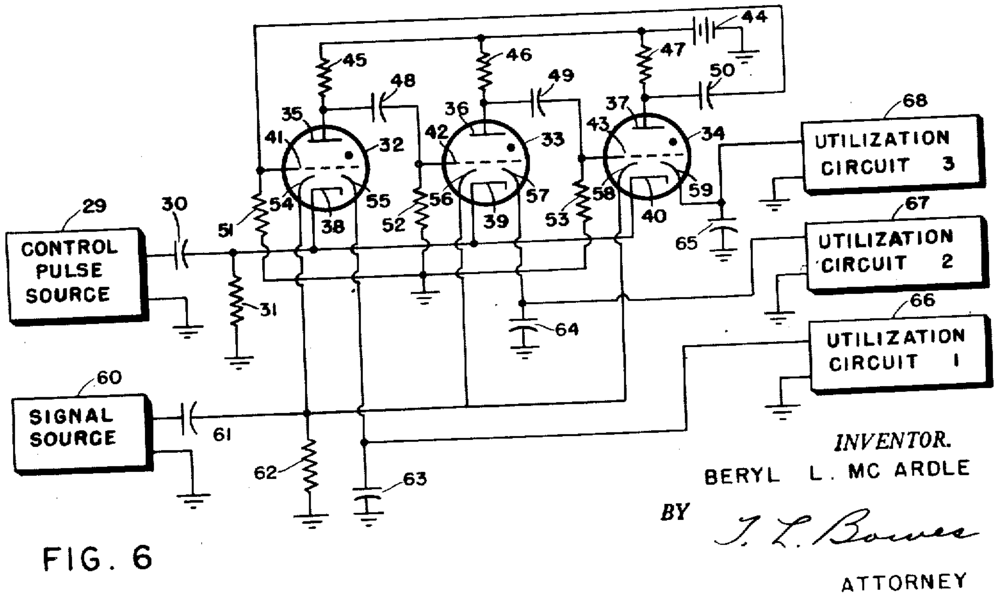
Fig. 6 is a schematic diagram, partially in block diagram form, of a gate circuit employing multiple gating stages according to my invention.

Figure 6 shows the application of my invention, as developed in connection with Figure 3, to the ring circuit diagrammed in Fig. 5. Reference numerals used in connection with Fig. 5 are retained in Fig. 6 because the components so designated may be the same in both figures. Added in Fig. 6 are a pair of probe elements to each of tubes 32, 33 and 34; a signal source; a capacitor for each of the gating stages; and a utilization circuit for each capacitor.

As shown in Fig. 6, tube 32 is provided with probe elements 54 and 55; tube 33 with probe elements 56 and 57; and tube 34 with probe elements 58 and 59. A source of signals 60 is coupled through capacitor 61 to resistor 62. The output voltage developed across resistor 62 is applied to probe elements 54, 56 and 58 in parallel. Capacitors 63, 64, and 65 are connected to probe elements 55, 57 and 59, respectively. It will be noted that each capacitor is effectively connected in series with resistor 62 across a corresponding pair of probe elements. Across each of capacitors 63, 64, and 65 are connected individual utilization circuits identified respectively by reference numerals 66, 67 and 68. I prefer these utilization circuits to be of the non-dissipative type.

Each gating stage shown in Fig. 6 operates in the manner explained in connection with Fig. 4. However, each of the stages conducts in turn as control pulses from source 29 transfer conduction from stage to stage around the ring. Thus, during the conduction of tube 32, capacitor 63 achieves a potential which is proportional to the potential appearing across resistor 62 at that time. The conductive period of tube 32 is followed by a conductive period for tube 33, beginning at a time determined by the occurrence of the next control pulse from source 29. When the conductive period for tube 33 occurs, capacitor 64 achieves a potential proportional to the potential appearing at that time across resistor 62. Finally, when tube 34 conducts, capacitor 65 achieves a potential which is proportional to the potential developed across resistor 62 during the conduction period of tube 34. This sequence of operations thereupon repeats. If utilization circuits 64, 65 and 66 are non-dissipative in character, capacitors 61, 62 and 63 will retain their charge until the tube with which they are respectively associated again conducts as part of the counting procedure.

The waveforms passed to each of utilization circuits 66—68 may be combined by any convenient means, such as mixer tubes, to provide a signal waveform comprising the addition of the voltages developed across capacitors 63, 64, and 65. With such an arrangement, if signal source 60 were furnishing, say, a speech waveform, the combined outputs of the utilization circuits would comprise a step function of that speech waveform, with the steps occurring at times determined by the receipt of pulses from control pulse source 29. Still another possibility is the use of this arrangement for speech secrecy, or "scrambling"; the order of taking the sampled and clamped potentials from utilization circuits 66—68 may be changed, as by means of a code wheel, before combining them, thereby preventing an eavesdropper from reconstructing the sampled and clamped waveform by integrating the intercepted speech waveform.

Figure 7:
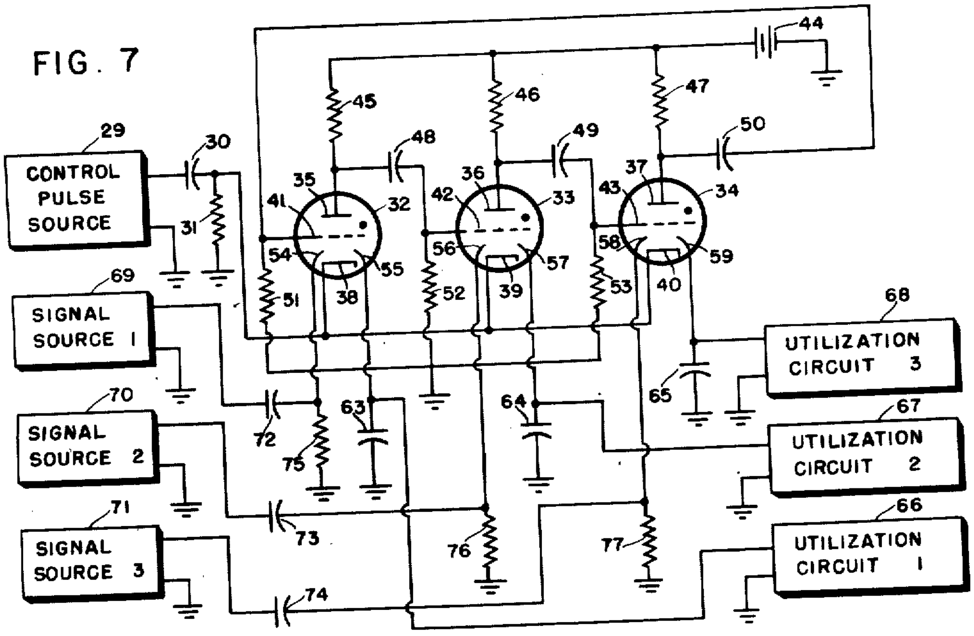
Fig. 7 is still another embodiment of a gate circuit employing multiple gating stages according to my invention.

An arrangement according to my invention which provides for sampling signals from a plurality of sources is illustrated in Fig. 7. Here, the single signal source 60 shown in Fig. 6 is replaced by signal sources 69, 70, and 71, which are respectively fed through capacitors 72, 73 and 74 to resistors 75, 76 and 77. Probe element 54 of the first ring stage 32 is connected across resistor 75; probe element 56 iof tube 33 is connected to resistor 76; and probe element 58 of tube 34 is connected to resistor 77. Conduction of each tube sequentially around the ring therefore causes sampling of signals from each of sources 69—71 in turn. The second, or output, probe element of each stage is connected as shown previously in Fig. 6.

In the embodiment of my invention illustrated in Fig. 7, when tube 32 conducts, the signal from signal source 69 is sampled and passed to utilization circuit 66; when tube 33 conducts, the signal from source 70 is sampled and is passed to utilization circuit 67; and when tube 34 conducts, a signal from source 71 is sampled and fed to utilization circuit 68. As mentioned previously, the sampled voltages developed across capacitors 63, 64 and 65 may be combined to form a single waveform containing samples of information from each of sources 69—71 in turn. Clamping, of course, may be omitted, in which case resistors are substituted for capacitors 63, 64 and 65. In either case, it is apparent that the circuit of Fig. 7 performs a commutation function analogous to that of a mechanically-driven rotating commutator. In other words, my invention, in the embodiment of Fig. 7, comprises an electronic commutator, and as such finds many applications, as in the field of telemetering.

Figure 8:
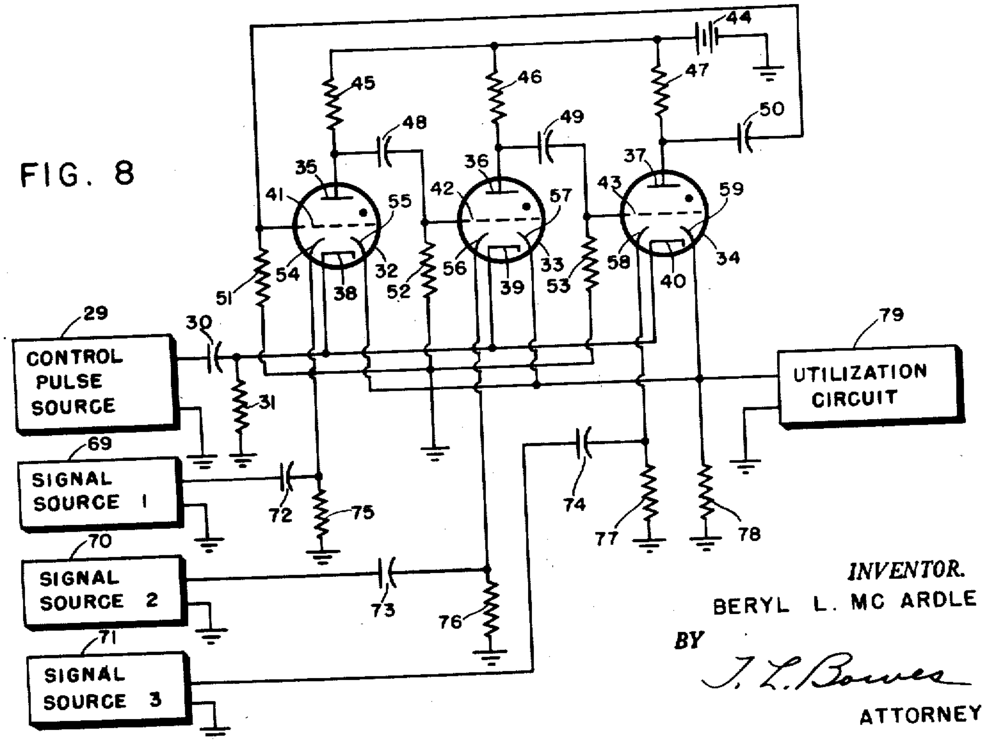
Fig. 8 is yet another embodiment of a gate circuit according to my invention.

Still another embodiment of my invention is shown in Fig. 8. Here separate signal sources 69—71 are employed as in Fig. 7. The second probe elements 55, 57 and 59 are connected in parallel, and a common output impedance, such as resistor 78, is connected between this parallel connection and ground. Output is taken from resistor 78 by a single utilization circuit 79. The ring-of-*n* counting circuit employed in this embodiment acts in the same manner as that shown in Fig. 5. Consequently, when tube 32 fires, a potential appears across resistor 78 which is proportional to the voltage being applied at that instant to resistor 75 from signal source 69. A similar action occurs for the other tubes of the ring when they conduct. The result is analogous, as in the embodiment of Fig. 7, to the action of a commutator.

While I have shown and described my invention as applied to specific embodiments thereof, other modifications will readily occur to those skilled in the art. I do not, therefore, desire my invention to be limited to the specific arrangement shown and described, and I intend in the appended claims to cover all modifications within the spirit and scope of my invention.

What I claim is:

1. in a gate circuit, the combination of a ring-of-*n* counting circuit having *n* stages, each including a gaseous discharge tube; a source of control pulses; said counting circuit being operative to transfer conduction from tube to tube around said ring response to the occurrence of said control pulses; each said gaseous discharge tube having at least an anode, a cathode, a control element, and a first and a second probe element; a plane of reference potential; a source of signal potential connected between said plane and the first probe element of each said tube; a plurality of output circuits, each said output circuit being connected between said plane in a corresponding one of said second probe elements of said tubes, whereby during the conductive period of each individual said tube the particular output circuit connected thereto achieves a potential proportional to that being furnished at that time by said source of signal potential to the first probe elements of all said tubes.

2. In a gate circuit, the combination of a ring-of-*n* counting circuit having *n* stages each including a gaseous discharge tube; a source of control pulses; said counting circuit being operative to transfer conduction from tube to tube around said ring responsive to the occurrence of said control pulses; each of said gaseous discharge tubes having at least an anode, a cathode, a control element, and a first and a second probe element; a plane of reference potential; a source of signal potential connected between said plane and the first probe element of each said tube; a plurality of capacitors, each said capacitor being connected between said plane and a corresponding one of said second probe elements of said tube; whereby during the conductive period of each individual said tube the particular capacitor connected thereto achieves an output potential proportional to that being furnished at that time by said source of signal potential to the first probe element of all said tubes, said output potential being substantially maintained by said particular capacitor after discharge ceases within said individual tube until said individual tube again becomes conductive.

3. In a gate circuit, the combination of a ring-of-*n* counting circuit having *n* stages, each including a gaseous discharge tube; a source of control pulses; said counting circuit being operative to transfer conduction from tube to tube around said ring responsive to the occurrence of said control pulses; each said gaseous discharge tube having at least an anode, a cathode, a control element, and a first and a second probe element; a plane of reference potential; a source of signal potential connected between said plane and the first probe element of each said tube; a plurality of capacitors, each said capacitor being connected between said plane and a corresponding one of said second probe elements of said tubes; a plurality of non-dissipative utilization circuits, each said utilization circuit being connected across a corresponding one of said capacitors, whereby each said utilization circuit is furnished an input potential by the particular capacitor to which said utilization circuit is connected; said input being substantially constant during a given conduction period of the corresponding said tube and during the time following, until said corresponding tube again conducts.

4. In a gate circuit, the combination of a ring-of-$n$ counting circuit having $n$ stages, each including a gaseous discharge tube; a source of control pulses; said counting circuit being operative to transfer conduction from tube to tube around said ring in response to the occurrence of said control pulses; each of said gaseous discharge tubes having at least an anode, a cathode, a control element, and at least a pair of probe elements; a plurality of signal sources; a plurality of output circuits; each said signal source being connected in series with a corresponding one of said output circuits between said probe element in a corresponding one of said tubes, whereby during the conduction period of each individual tube, the particular output circuit connected thereto achieves a potential proportional to that furnished by the corresponding one of said signal sources.

5. In a gate circuit, the combination of a ring-of-$n$ counting circuit having $n$ stages, each including a gaseous discharge tube; a source of control pulses; said counting circuit being operative to transfer conduction from tube to tube around said ring in response to the occurrence of said control pulses; each of said gaseous discharge tubes having at least an anode, a cathode, a control element, and at least a pair of probe elements; a plurality of signal sources; a plurality of capacitors, each said signal source being connected in series with a corresponding one of said capacitors between said probe elements in a correspoding one of tubes, whereby during the conduction period of each individual tube, the particular capacitor connected thereto achieves a potential proportional to that furnished by the corresponding one of said signal sources.

6. In a gate circuit, the combination of a ring-of-$n$ counting circuit having $n$ stages, each including a gaseous discharge tube; a source of control pulses; said counting circuit being operative to transfer conduction from tube to tube around said ring in response to the occurrence of said control pulses; each said gaseous discharge tube having at least an anode, a cathode, a control element, and at least a pair of probe elements; a plurality of signal sources; a plurality of capacitors, each said signal source being connected in series with a corresponding one of said capacitors between said probe elements in corresponding ones of said tubes; a plurality of substantially non-dissipative utilization circuits having a pair of input terminals, said terminals of each said utilization circuit being connected across said individual corresponding ones of said capacitors, whereby during the conduction period of each individual tube the particular capacitor connected thereto achieves an output potential proportional to that furnished by the corresponding one of said signal sources, said output potential being maintained at said input terminals of a respective one of said utilization circuits after the conduction period of the corresponding one of said tubes until the next conduction period of that same tube.

7. In a gate circuit, the combination of a ring-of-$n$ counting circuit having $n$ stages, each including a gaseous discharge tube; a source of control pulses; said counting circuit being operative to transfer conduction from tube to tube around said ring in response to the occurrence of said control pulses; each said gaseous discharge tube having at least an anode, a cathode, a control element, and at least a first and second probe element; a plane of reference potential; a plurality of signal sources, each said signal source being connected between a corresponding one of said second probe elements and said plane; said second probe elements being connected in parallel with each other; a common output impedance connected between said parallel connection of said second probe elements and said plane, whereby during the conduction period of each individual tube, an output potential appears across said output impedance which is proportional to the potential being furnished during that period by the corresponding one of said signal sources.

References Cited in the file of this patent

UNITED STATES PATENTS

| | | |
|---|---|---|
| 1,629,009 | Snook | May 17, 1927 |
| 2,015,885 | Dallenbach | Oct. 1, 1935 |
| 2,076,335 | Dallenbach | Apr. 6, 1937 |
| 2,299,229 | Hall | Oct. 20, 1942 |
| 2,470,920 | Colson | May 24, 1949 |
| 2,503,958 | Lyons | Apr. 11, 1950 |
| 2,536,578 | Slayton | Jan. 2, 1951 |
| 2,565,102 | Toulon | Apr. 21, 1951 |
| 2,565,103 | Toulon | Aug. 21, 1951 |
| 2,575,516 | Hagen | Nov. 20, 1951 |
| 2,610,293 | Hanchett | Sept. 9, 1952 |
| 2,655,605 | Hartley et al. | Oct. 13, 1953 |
| 2,658,142 | St. John | Nov. 3, 1953 |
| 2,659,815 | Curtis | Nov. 17, 1953 |

UNITED STATES PATENT OFFICE

CERTIFICATE OF CORRECTION atent No. 2,792,525 May 14, 1957

Beryl L. McArdle

It is hereby certified that error appears in the printed specification of the above numbered patent requiring correction and that the said Letters Patent should read as corrected below.

Column 5, line 49, for "iof" read --of--; column 7, line 6, after input" insert --potential--.

Signed and sealed this 27th day of August 1957.

(SEAL)
Attest:

KARL H. AXLINE

Attesting Officer

ROBERT C. WATSON
Commissioner of Patents